United States Patent
Kita

(10) Patent No.: US 7,260,247 B2
(45) Date of Patent: Aug. 21, 2007

(54) CARD TYPE DEVICE CAPABLE OF READING FINGERPRINT AND FINGERPRINT IDENTIFICATION SYSTEM

(75) Inventor: Kazunori Kita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 797 days.

(21) Appl. No.: 10/732,776

(22) Filed: Dec. 9, 2003

(65) Prior Publication Data

US 2005/0100197 A1    May 12, 2005

(30) Foreign Application Priority Data

Dec. 25, 2002   (JP)   ............................. 2002-374721

(51) Int. Cl.
*G06K 9/00* (2006.01)
(52) U.S. Cl. .................... 382/126; 382/124; 382/125
(58) Field of Classification Search ............... 382/126, 382/124, 125
See application file for complete search history.

(56) References Cited

U.S. PATENT DOCUMENTS

| | | | |
|---|---|---|---|
| 4,550,999 A | 11/1985 | Anderson | |
| 6,041,410 A | 3/2000 | Hsu et al. | |
| 6,282,303 B1 | 8/2001 | Brownlee | |
| 6,324,310 B1 * | 11/2001 | Brownlee | ................... 382/312 |
| 2001/0052541 A1 | 12/2001 | Kang et al. | |
| 2003/0016848 A1 | 1/2003 | Kitajima et al. | |
| 2003/0035568 A1 * | 2/2003 | Mitev et al. | ................ 382/124 |
| 2003/0235329 A1 | 12/2003 | Komatsuzaki et al. | |
| 2004/0234112 A1 | 11/2004 | Boker et al. | |

FOREIGN PATENT DOCUMENTS

| | | |
|---|---|---|
| EP | 0 128 672 A1 | 12/1984 |
| EP | 0 924 656 A2 | 6/1999 |
| JP | 10-079017 | 3/1998 |
| JP | 2000-048177 A | 2/2000 |
| JP | 2000-182025 A | 6/2000 |
| JP | 2001-243444 A | 9/2001 |
| JP | 2002-113402 A | 5/2002 |

(Continued)

OTHER PUBLICATIONS

European Communication pursuant to Article 96(2) EPC for EP Application No. 03 029 475.5 dated Mar. 16, 2006.

*Primary Examiner*—Matthew C. Bella
*Assistant Examiner*—Mike Rahmjoo
(74) *Attorney, Agent, or Firm*—Frishauf, Holtz, Goodman & Chick, P.C.

(57) ABSTRACT

A card type device is mounted on a card slot of an electronic appliance. A transparent cylindrical-shaped roller is provided at an edge portion of a housing such that an outer peripheral plane of the roller is projected from the edge portion. A one-dimensional image sensor is provided inside the roller, which acquires one-dimensional fingerprint data of a finger of a user, and this fingerabuts against the outer peripheral plane of the roller. Since the finger abutting against the outer peripheral plane of the roller is moved, the roller is rotated, so that one-dimensional fingerprint data which are continuously acquired by the one-dimensional image sensor are synthesized with each other to produce fingerprint data as a two-dimensional image. The synthesized fingerprint data is transmitted to the electronic appliance which carries out fingerprint identification.

9 Claims, 11 Drawing Sheets

FOREIGN PATENT DOCUMENTS

| | | |
|---|---|---|
| JP | 2002-133402 A | 5/2002 |
| KR | 2001-0000534 A | 1/2001 |
| KR | 2001-0022253 A | 5/2001 |
| KR | 2001-0113916 A | 11/2001 |
| WO | WO96/17480 A2 | 6/1996 |
| WO | WO96/63476 A1 | 12/1999 |
| WO | WO 00/27471 A1 | 5/2000 |
| WO | WO 01/67390 A1 | 9/2001 |
| WO | WO 02/073516 A1 | 9/2002 |

* cited by examiner

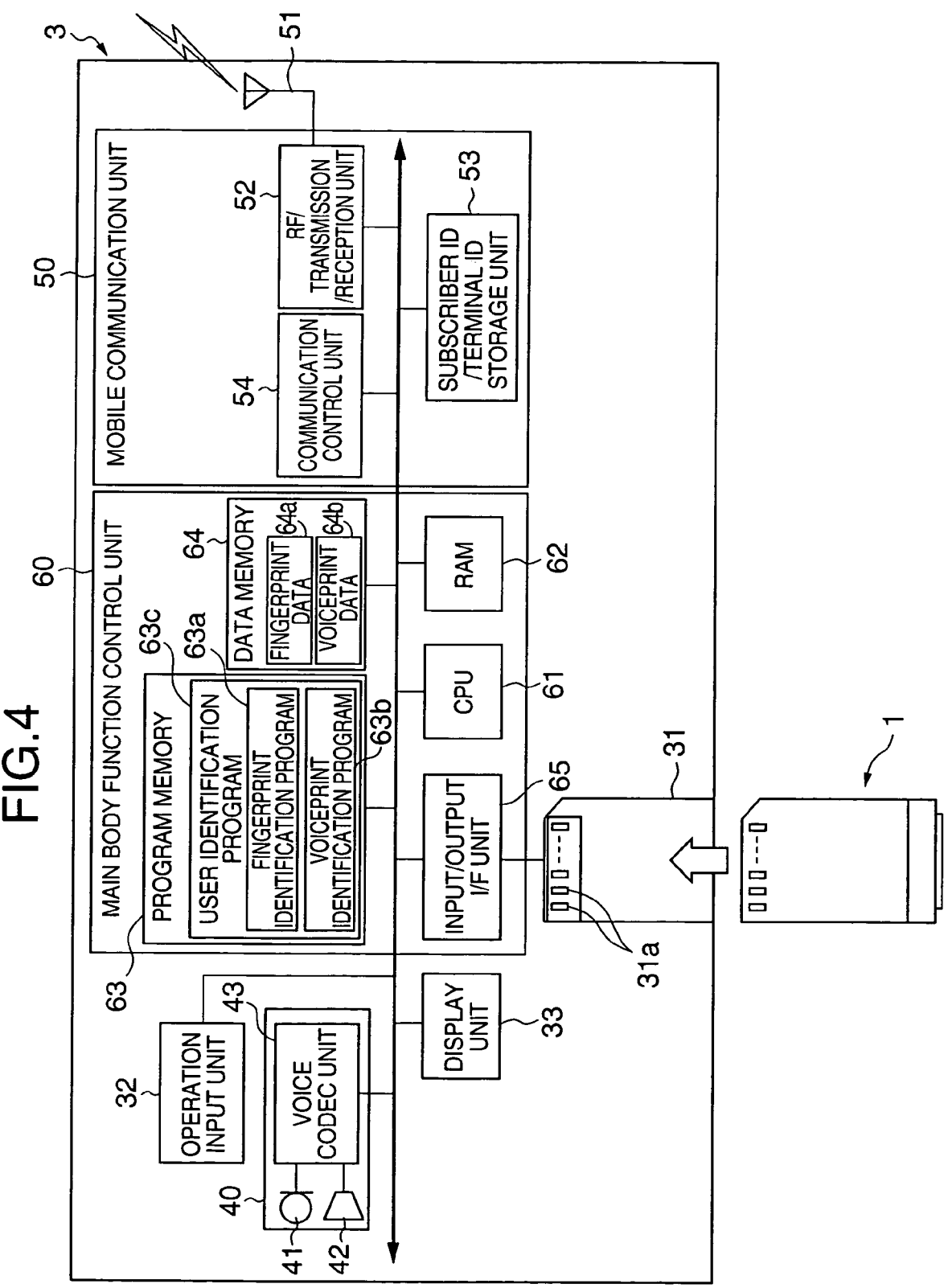

CARD TYPE DEVICE CAPABLE OF READING FINGERPRINT AND FINGERPRINT IDENTIFICATION SYSTEM

BACKGROUND OF THE INVENTION

1. Field of the Invention

The present invention is related to a card type device having a fingerprint reading function and a fingerprint identification system using the card type device.

2. Description of the Related Art

Very recently, since electronic appliances are gradually utilized in the network form, communications are freely established among these electronic appliances connected to each other via networks, so that various sorts of information thereof may be accessed everywhere. In connection with such a network operation, needs of security aspects capable of preventing illegal accesses made by third party are increased.

As one of such security techniques, a method capable of identifying a regular user by checking a fingerprint has been proposed, and a fingerprint reading sensor is provided on a PC card. When a user depresses his finger on a fingerprint sensor of such a PC card, a fingerprint of this finger is acquired. Then, user identification is carried out based upon this acquired fingerprint, so that an access to such an information having high secrecy may be controlled.

Such a PC card may have the following structure. That is, a fingerprint reading sensor constructed of a CCD (charge-coupled device) is provided on a surface of this PC card itself. Alternatively, a fingerprint reading unit is mounted on any position except for an insertion portion of the PC card.

However, if the fingerprint reading sensor is provided on the surface of the PC card, then the following problem may occur. That is, when this PC card is loaded on a card slot of an electronic appliance, the fingerprint reading sensor is located inside the card slot, so that the user cannot be identified by operating this fingerprint reading sensor under such a condition that this PC card is loaded on the electronic appliance. Also, if the fingerprint sensor is provided on any position other than the PC card insertion portion, then another problem may occur. That is, when this PC card is loaded in the PC card slot, since this PC card is largely projected out from the PC card slot, the PC card equipped with such a fingerprint reading sensor can be hardly carried while this PC card is continuously loaded on the electronic appliance.

On the other hand, both the fingerprint reading sensors are manufactured in plane rectangular shapes on which the finger can be mounted. Since these fingerprint reading sensors employ such expensive semiconductor devices as a CCD, higher cost is required. Furthermore, since two-dimensional CCD chips necessarily require mounting areas thereof, fingerprint reading sensors cannot be provided with microminiture type memory cards which are known as a CF card (Compact Flash Card), an SD memory card (Secure Digital Memory Card), an MMC card (Multi-Media Card), and a USB-connection portable type flash memory card. These memory cards are used as extended memories employed in a portable telephone and a PDA (Personal Digital Assistance). As a result, information stored in these memory cards cannot be protected by utilizing the fingerprint identification. Moreover, the fingerprint identification functions cannot be extended to the portable telephone and the PDA by way of such memory cards.

The present invention has been made to solve the above-described problems, and therefore, has an object to provide a microminiture card type device on which a fingerprint reading sensor is mounted, and also to provide an identification system using this card type device.

SUMMARY OF THE INVENTION

To achieve the above-described object, a card type device, according to an aspect of the present invention, is featured by such a card type device connected to an electronic appliance, comprising:

a card type housing having a connection terminal used to be connected to the electronic appliance;

a transparent cylindrical-shaped roller provided at an edge plane of said card type housing, the outer peripheral plane of which is projected from the edge plane;

a one-dimensional image sensor provided inside the roller, for acquiring one-dimensional fingerprint image data of a finger which abuts against the outer peripheral plane of the roller;

fingerprint data synthesizing means for synthesizing two-dimensional fingerprint data from the one-dimensional fingerprint image data which are continuously acquired from the one-dimensional image sensor by rotating the roller by moving the finger abutting against the outer peripheral plane of the roller; and an interface unit for transmitting/receiving data via the connection terminal between the own card type device and the electronic appliance.

Also, an identification system, according to another aspect of the present invention, is featured by such an identification system arranged by connecting an electronic appliance to a card type device, in which:

the card type device is comprised of:

a card type housing having a connection terminal;

a transparent cylindrical-shaped roller provided at an edge plane of the card type housing, the outer peripheral plane of which is projected from the edge plane;

a one-dimensional image sensor provided inside the roller, for acquiring one-dimensional fingerprint image data of a finger which abuts against the outer peripheral plane of the roller;

fingerprint data synthesizing means for synthesizing two-dimensional fingerprint data from the one-dimensional fingerprint image data which are continuously acquired from the one-dimensional image sensor by rotating the roller by moving the finger abutting against the outer peripheral plane of the roller; and an interface unit for transmitting/receiving data via the connection terminal between the own card type device and the electronic appliance; and wherein:

the electronic appliance is comprised of:

a control unit for identifying as to whether or not the fingerprint data transmitted from the card type device is made coincident with previously-registered fingerprint data, and for restricting operation of the electronic appliance in the case that the control unit judges that the transmitted fingerprint data is not made coincident with said previously-registered fingerprint data.

BRIEF DESCRIPTION OF THE DRAWING

For a better understanding of the present invention, reference is made of a detailed description to be read in conjunction with the accompanying drawings, in which:

1B is a side view for showing the card type device of FIG. 1A.

FIG. 4 is a schematic block diagram for indicating a functional structure of an electronic appliance according to a first embodiment, to which the present invention is applied;

DESCRIPTION OF THE PREFERRED EMBODIMENTS

Referring now to drawings, various preferred embodiments of the present invention will be described in detail.

Outer View of First Card Type Device

Figure 1:
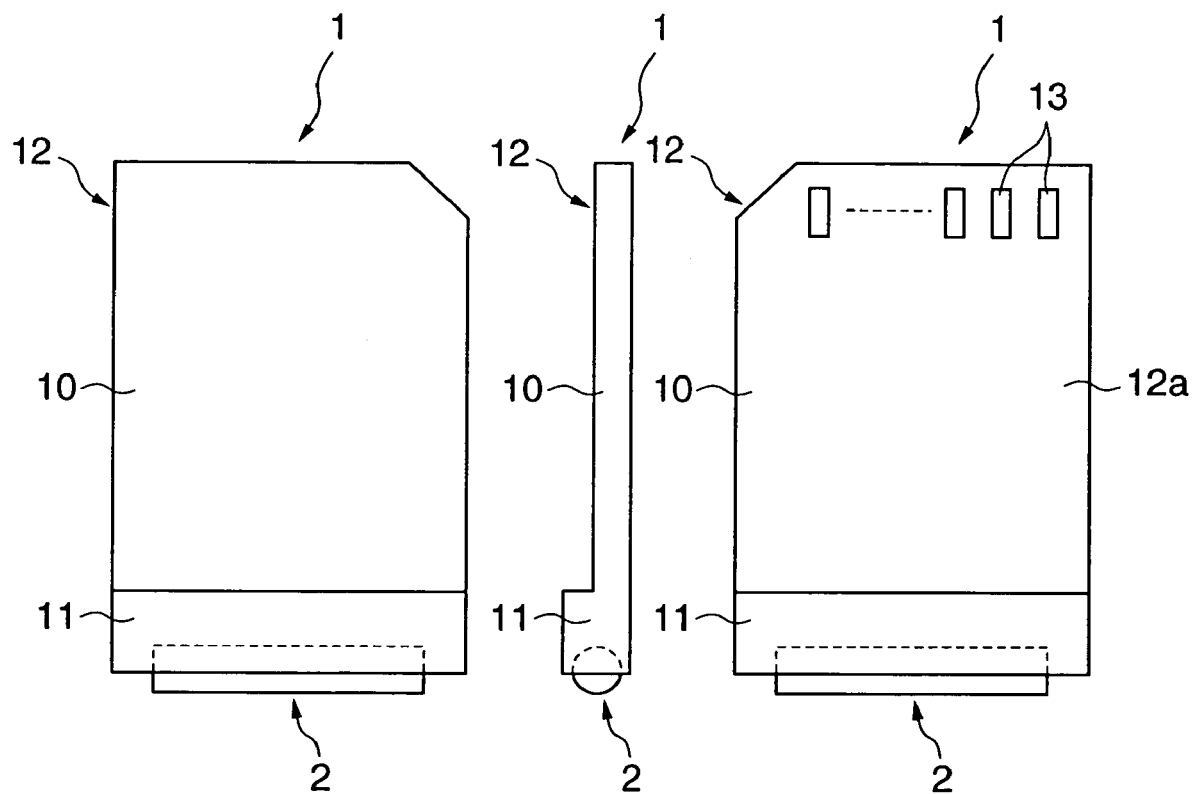
FIG. 1A is a front view for indicating an outer appearance construction of a card type device according to a first embodiment, to which the present invention is applied; FIG.
FIG. 1C is a rear view for representing the card type device of FIG. 1A.

FIG. 1 shows an outer appearance view of a card type device 1 according to a first embodiment of the present invention. The card type device 1 contains a memory member having a predetermined storage capacity, and is used in such a manner that this card type device 1 is inserted into a card slot provided with an electronic appliance. This card type device 1 corresponds to, for example, a standardized memory card known as a PC (Personal Computer) card, a CF (Compact Flash) card, an SD (Secure Digital) memory card, and MMC (Multi-Media Card). In a housing 10 of this card type device 1, a fingerprint reading unit 2 is provided on one edge portion 11, and a connection terminal 13 is provided on a rear surface 12a of the other edge portion 12. This connection terminal 13 is employed so as to be electrically connected to an electronic appliance. Also, in the card type device 1, the other edge portion 12 of the housing 10 thereof constitutes an insertion portion which is inserted into a card slot of the electronic appliance, and the one edge portion 11 where the fingerprint reading unit 1 is provided is exposed from this card slot.

Functional Structure of Card Typ Device 1

Figure 2:
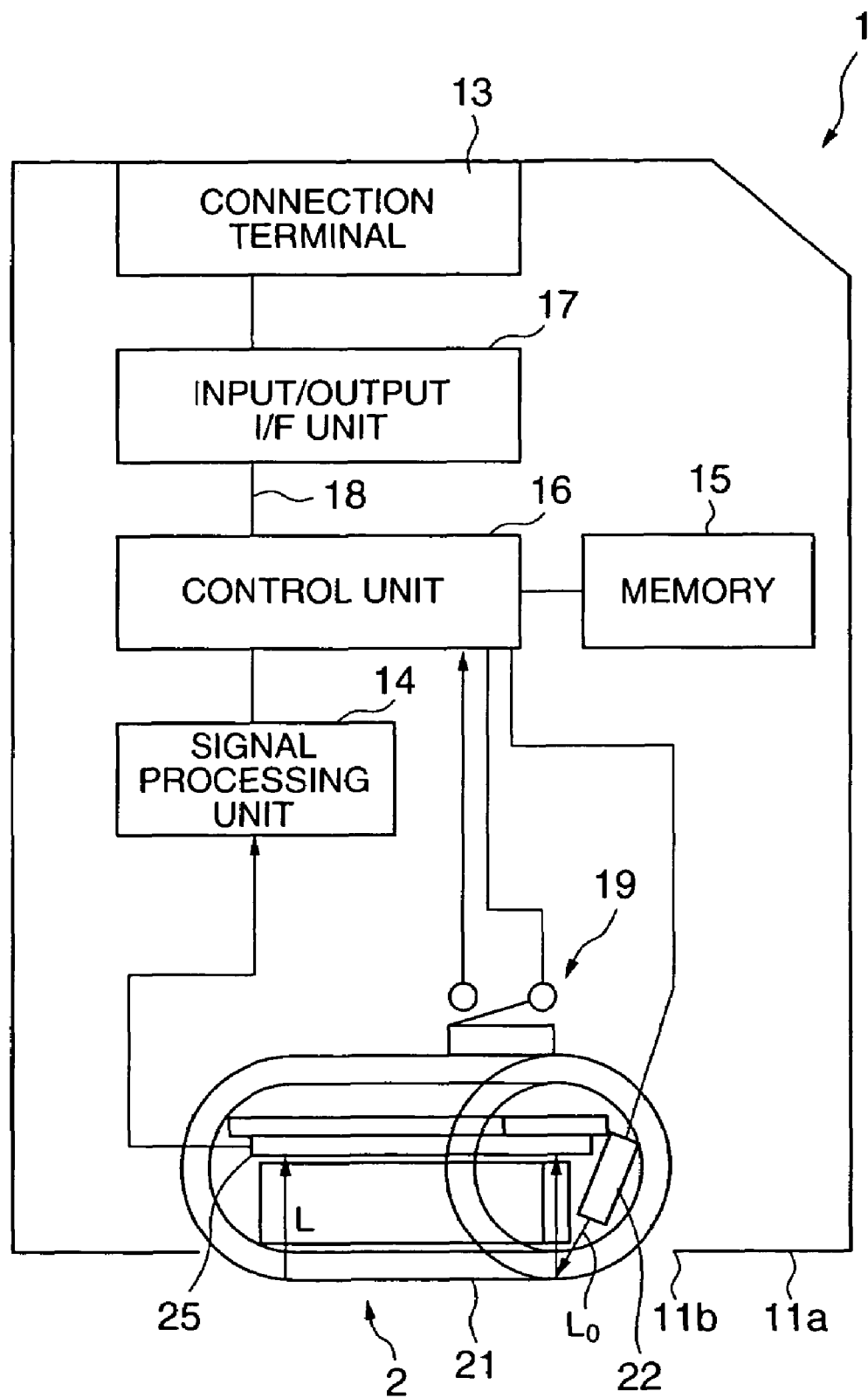
FIG. 2 is a block diagram for schematically showing a functional structure of the card type device according to the first embodiment, to which the present invention is applied.

FIG. 2 schematically indicates a functional structure of the above-described card type device 1. The card type device 1 is arranged by employing a signal processing unit 14, a memory 15, a control unit 16, and an input/output I/F unit 17 in addition to both the fingerprint reading unit 2 and the connection terminal 13. The respective structural elements are connected to each other via a bus 18.

Construction of Fingerprint Reading Unit 2

Figure 3:
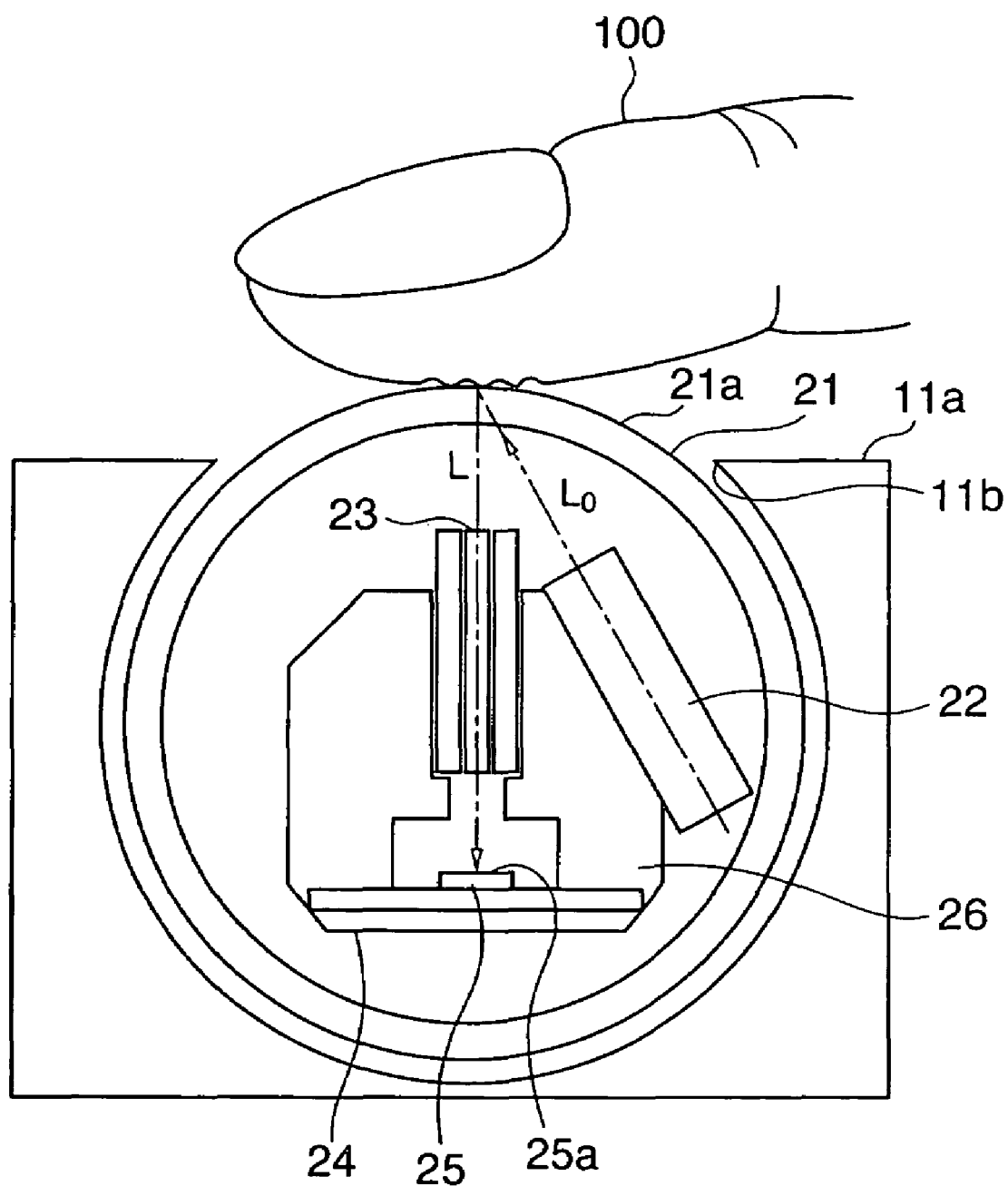
FIG. 3 is a side view for schematically indicating a structural example of a fingerprint reading unit 2 shown in FIG. 2.

FIG. 3 is a sectional view for showing a construction of the fingerprint reading unit 2. The fingerprint reading unit 2 owns a roller 21, while a portion of an outer peripheral plane 21a of this roller 21 is projected from a slit 11b to an external area. The slit 11b is formed in one edge plane 11a of the housing. The roller 21 represents a cylindrical shape, and is made of a light transparent material such as acrylic resin, polycarbonats, borosilicate glass, quartz glass, and so on.

A light source 22, a SELFOC (trademark) lens array 23, a board 24, a one-dimensional image sensor 25, and a holder 26 are provided inside a hollow portion of the roller 21. This holder 26 holds these components 22 to 25. The holder 26 is elongated from one end, or both ends of the roller 21, and then is fixed to the housing 10. Even when the roller 21 is rotated, this holder 26 is supported by the housing 10 under such a condition that this holder 26 is not rotated.

The light source 22 illuminates fingerprint reading light "$L_0$" to a finger 100 of a user which abuts against the outer peripheral plane 21a of the roller 21 by emitting light toward the slit 11b. This light source 22 is constituted by a self-light-emitting element such as an LED (light emitting diode), an organic EL (electroluminescence), an inorganic EL, and a fluorescent tube.

The SELFOC lens array 23 is such an optical component that a plurality of SELFOC lenses having center axes are arrayed so as to form a lens array located parallel to a roller center of the roller 21, while the center axes are positioned perpendicular to the roller center of this roller 21. The SELFOC lens array 23 focus an one-dimensional image of the finger 100 which abuts against the outer peripheral plane 21a of the roller 21 onto the one-dimensional image sensor 25. The optical axis of this SELFOC lens array 23 is intersected perpendicular to the roller center of the roller 21, and a light incident plane 23a of the SELFOC lens array 23 is directed to the slit 11b.

It should be understood that a SELFOC lens corresponds to a rod lens having a cylindrical shape. This rod lens owns a parabolic refraction index distribution from a center axis of the own rod lens and a peripheral plane thereof, and also corresponds to a self-converging type lens in which the highest refraction index is realized at the center axis thereof and the lowest refraction index is realized at the peripheral plane thereof. Each of the SELFOC lenses has an optically equivalent effect with respect to that of a spherical lens, while all of these SELFOC lenses own optically equivalent natures with each other.

A one-dimensional image of the finger 10 which is focused onto the light receiving plane 25a of the one-dimensional image sensor 25 by the SELFOC lens array 23 has the magnification equal to that of the one-dimensional image of the finger 100 which abuts against the outer peripheral plane 21a of the roller 21, and is directed to the same direction of this one-dimensional image.

As to the board 24, the one-dimensional image sensor 25 is mounted on a surface of this board 24, and a wiring pattern is formed on the surface thereof in order to transmit/receive signals to/from both the signal processing unit 14 and the control unit 16.

The one-dimensional image sensor 25 is constituted by a photoelectric converting element such as a linear type CCD image sensor, and a linear type CMOS image sensor. This linear type image sensor 25 is provided in a parallel manner along the roller center of the roller 21 in such a manner that the light receiving plane 25a thereof is located opposite to the slit 11b. The one-dimensional image sensor 25 converts a one-dimensional image of a fingerprint which is focused onto the light receiving plane 25a by the SELFOC lens array 23 and the like into a one-dimensional fingerprint signal functioning as an electric signal.

Both a microswitch 19 and a rotary encoder (not shown) are provided with the roller 21. The microswitch 19 turns ON/OFF a connection established between the fingerprint reading unit 2 and the control unit 16. The rotary encoder produces a pulse signal to output this pulse signal to the control unit 16 every time the roller 21 is rotated at a preselected angle. The microswitch 19 is turned ON when the finger 100 is contacted to the outer peripheral plane 21a of the roller 21 under certain pressure condition, and is turned OFF when the finger 100 is released from this outer peripheral plane 21a.

It should also be noted that instead of the above-explained rotary encoder, while a predetermined printed pattern used to detect a rotation amount is printed on the outer peripheral plane 21a of the roller 21, this printed pattern is read in order that the rotation amount may be sensed by the control unit 16.

The signal processing unit 14 converts the one-directional fingerprint signal corresponding to the analog signal into a digital signal so as to produce one-dimensional fingerprint data, and then outputs this one-dimensional fingerprint data via the control unit 16 to the memory 15.

The control unit 16 is provided with a CPU (Central Processing Unit), a RAM (Random Access Memory), a ROM (Read-Only Memory), and the like. The control unit 16 expands a designated program to a predetermined memory area of the RAM, and executes various sorts of process operations such as fingerprint reading process operation in accordance with the expanded program. The designated program includes a fingerprint reading program which has been stored in either the RAM or the ROM.

The fingerprint reading process operation is commenced by turning ON the microswitch 19. When the user moves the finger 100 along one direction under such a condition that the finger 100 is contacted to the outer peripheral plane 21a of the roller 21 by applying certain pressure, this roller 21 is rotated. At this time, this microswitch 19 is caused to be turned ON, and every time the roller 21 is rotated at a predetermined angle, a pulse signal is generated from the rotary encoder. The light source 22 irradiates the fingerprint reading light "$L_0$" with respect to the finger 100. Light "L" reflected from the finger 100 is collected to the light receiving plane 25a of the one-dimensional image sensor 25 by way of the SELFOC lens array 23 and the like. The one-dimensional image sensor 25 produces a one-dimensional fingerprint signal in synchronism with the pulse signal, and then outputs this one-dimensional fingerprint signal to the signal processing unit 14. In the signal processing unit 14, the one-dimensional fingerprint signals which are sequentially entered thereinto in synchronism with the pulse signal are sequentially A/D-converted to one-dimensional fingerprint data, and then, the one-dimensional fingerprint data are sequentially outputted to the memory 15. The control unit 16 synthesizes fingerprint data functioning as a two-dimensional image of a fingerprint of the finger 100 from the one-dimensional fingerprint data stored in the memory 15 based upon the rotation direction of the roller 21.

The produced fingerprint data is transmitted via the input/output I/F unit 17 and the connection terminal 13 to an electronic appliance (will be discussed later). It should be noted that the input/output I/F unit 17 is provided so as to transmits various sorts of data containing fingerprint data between this card type device 1 and the electronic appliance in accordance with a predetermined transmission system.

First Electronic Appliance 3

Referring now to FIG. 4 to FIG. 8, a description is made of an electronic appliance 3 according to a first embodiment of the present invention, on which the above-described card type device 1 is mounted. Since the card type device 1 is mounted on the electronic appliance 3, this electronic appliance 3 can perform identification of users based upon fingerprints of these users.

As indicated in FIG. 4, the electronic appliance 3 is equipped with a card slot 31, an operation input unit 32, a display unit 33, a voice input/output unit 40, a mobile communication unit 50, a main body function control unit 60, and the like. These structural units are connected to each other via a bus 34. The electronic appliance 3 is equipped with various sorts of functions such as a wireless communication function capable of communicating with an external unit; an address record function capable of managing names, addresses, and telephone numbers; and a schedule function for managing dates, times, and scheduled contents. The electronic appliance 3 can restrict either a portion of these functions or all of these functions based upon an identification result of a user.

Also, since the card type device 1 is mounted on the electronic appliance 3, this electronic appliance 3 may be used as a personal identifying apparatus as to access identification to a Web site, and an electronic settlement made in an electronic commercial transaction via a network such as the Internet.

Figure 5A:
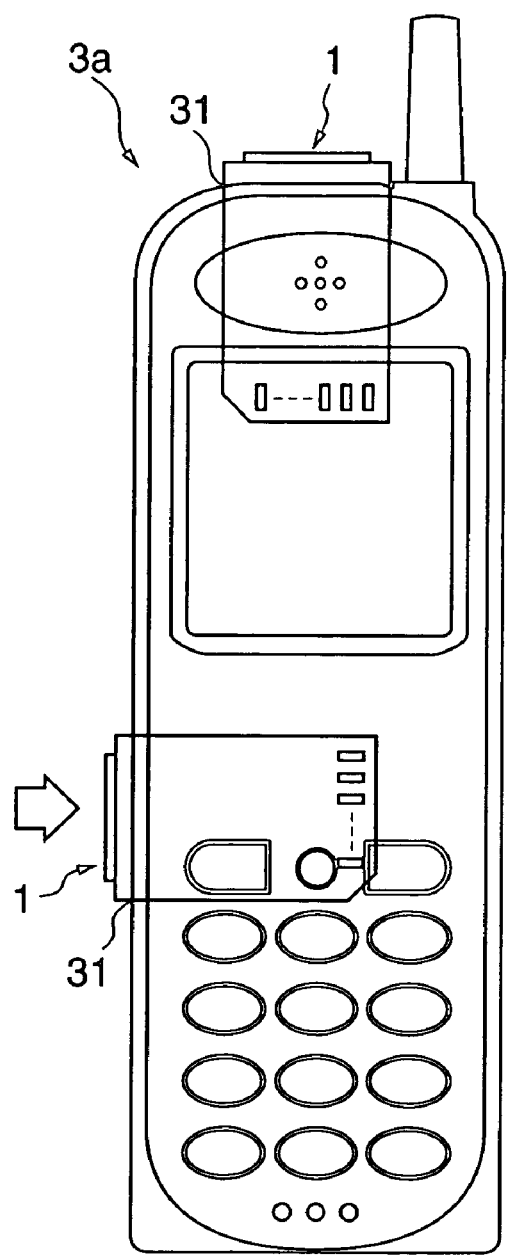
FIG. 5A and FIG. 5B illustratively show an example of outer appearance constructions of the electronic appliance indicated in FIG. 4.
Figure 5B:
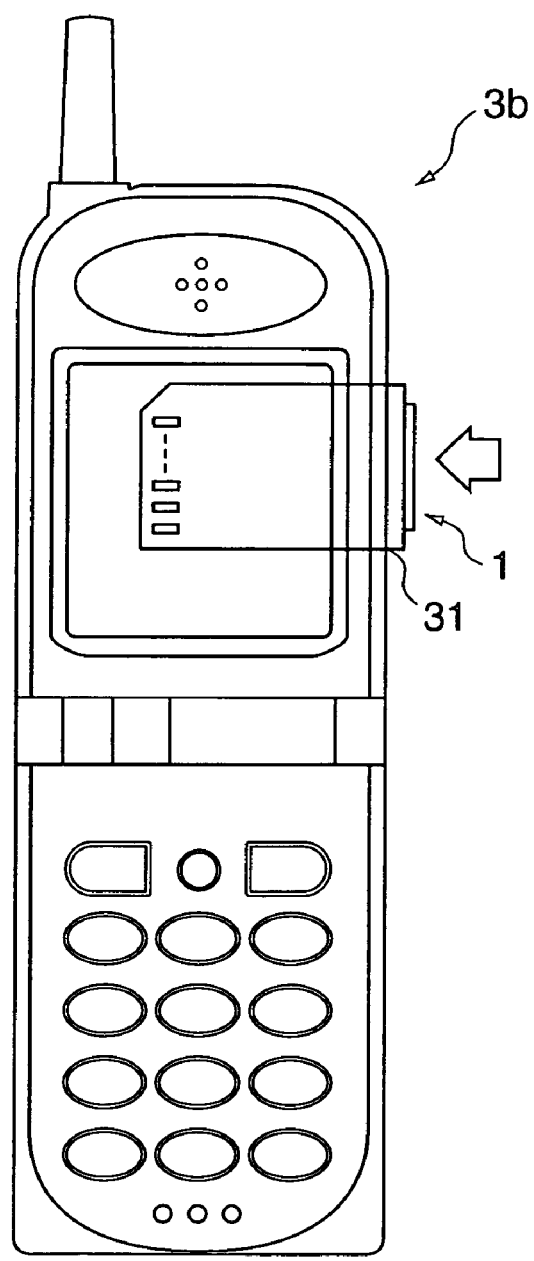
Figure 6:
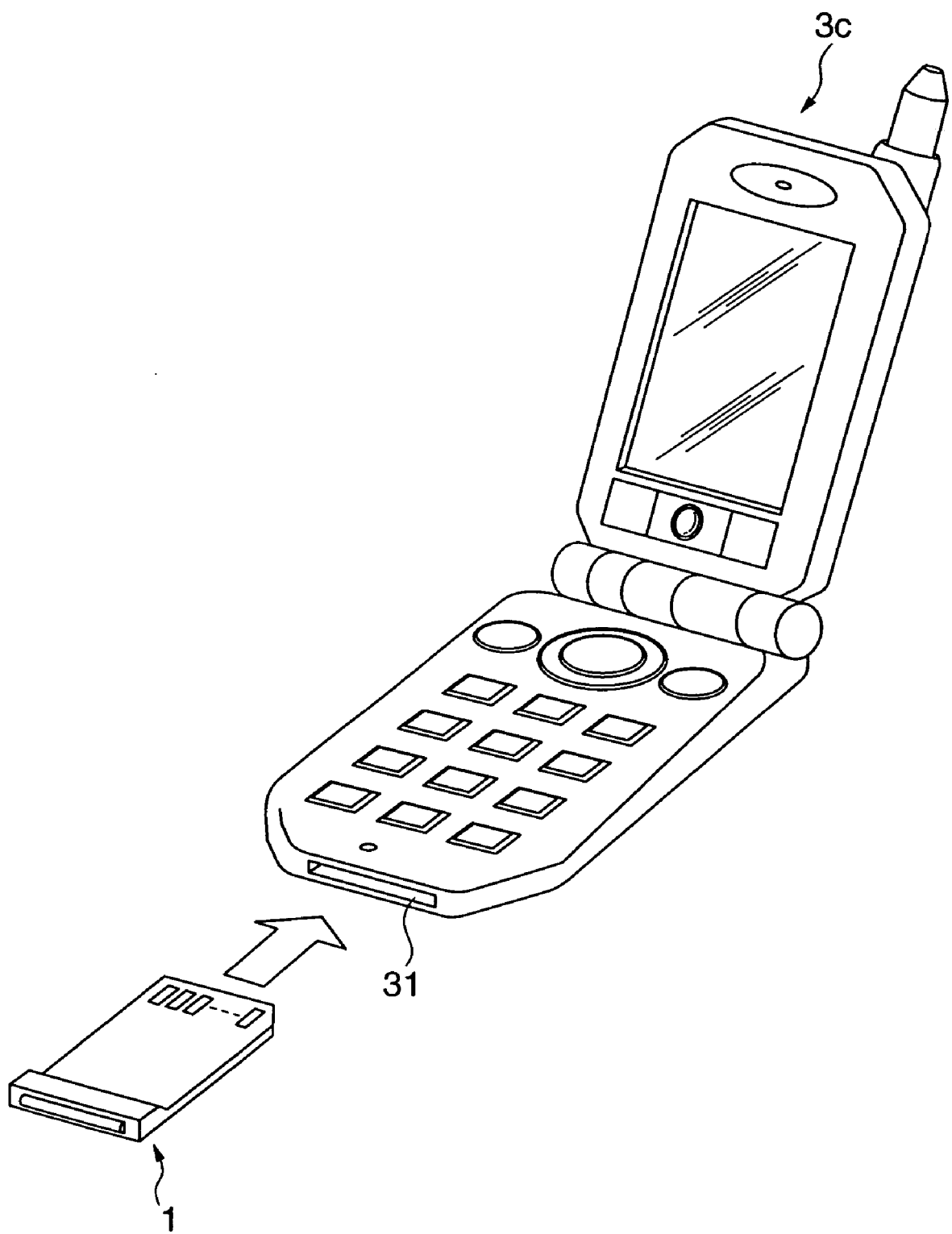
FIG. 6 illustratively shows another outer structural example of the electronic appliance indicated in FIG. 4.
Figure 7:
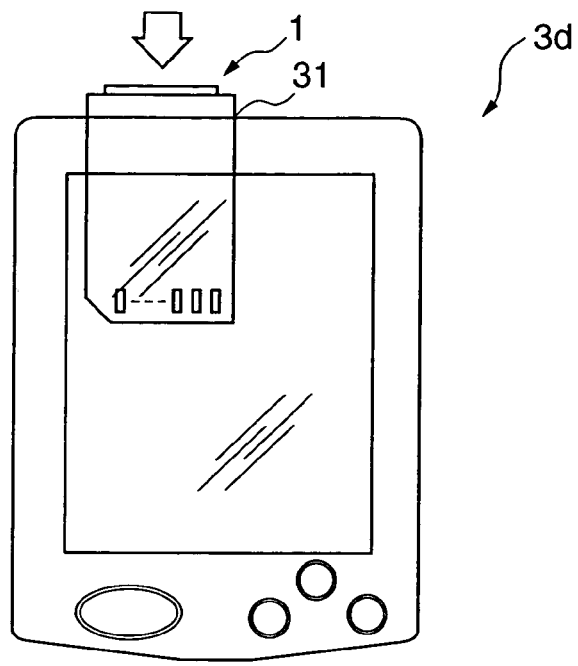
FIG. 7 illustratively indicates another outer appearance structural example of the electronic appliance indicated in FIG. 4.
Figure 8:
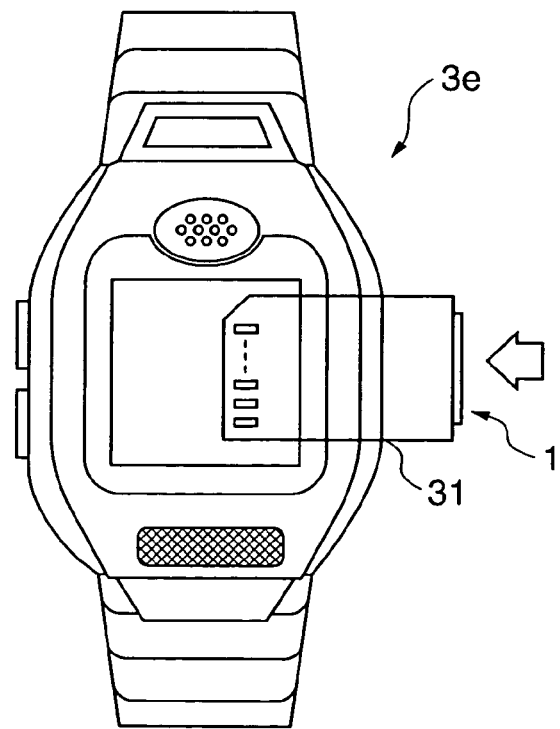
FIG. 8 illustratively represents another outer appearance structural example of the electronic appliance indicated in FIG. 4.

As such an electronic appliance 3 various sorts of electronic appliances may be realized, for example, portable telephones 3a and 3b indicated in FIG. 5A and FIG. 5B; a folding type portable telephone 3c indicated in FIG. 6; a portable type information appliance 3d such as a PDA (Personal Digital Assistant) indicated in FIG. 7; and a body mounting type electronic appliance 3e such as a wrist watch shown in FIG. 8.

It should also be noted that as shown in FIG. 5 to FIG. 8, the positions of the card slots 31 provided on these electronic appliances 3a to 3e are not limited only to these illustrated positions. As a consequence, when the card type device 1 is mounted on each of these electronic appliances 3a to 3e, the mounting position of the card slot 31 may be set in such a manner that the roller 21 of the fingerprint reading unit 2 may be rotated while the finger 100 is contacted to this roller 21 by applying certain pressure.

The card slot 31 is provided with a connection connector 31. Then, the card type device 1 is inserted into this card slot 31 so as to be connected to the connection terminal 13, so that the card type device 1 is electrically connected to the electronic appliance 3.

The operation input unit 32 is equipped with a ten-numeral entry key, various sorts of function keys, and the like. In response to a key operation, the operation input unit 32 outputs a depression signal to the CPU 61.

The display unit 33 is equipped with a display screen such as an LCD (Liquid Crystal Display), and displays thereon information based upon display information entered from the CPU 61.

The voice input/output unit 40 is constructed by employing a microphone 41, a speaker 42, a voice (speech) codec unit 43. In the voice codec unit 43, a voice signal (analog voice signal) entered from the microphone 41 is converted by an A/D converter (not shown in detail) into a digital voice signal, and this digital voice signal is outputted to the mobile communication unit 50. Also, the voice codec unit 43 decodes a voice signal (digital voice signal) which is externally received via the mobile communication unit 50, and D/A-converts this digital voice signal) into an analog voice signal, and then, outputs this analog voice signal to the speaker 42.

The mobile communication unit 50 is equipped with an antenna 51, an RF/transmission/reception unit 52, a subscriber ID/terminal ID storage unit 53, a communication control unit 54, and the like. The antenna 51 transmits/receives a wireless signal related to call receiving/call transmitting operations between the own antenna 51 and a wireless base station (not shown). In this mobile communication unit 50, the communication control unit 54 executes the communication protocol used for the portable telephone, which corresponds to such an IMT-2000 standardized communication system (for example, either W-CDMA or cdma 2000) between the own communication control unit 54 and the wireless base station. Thus, the communication control unit 54 transmits/receives voice signals to be transmitted/received, and also performs a data communication.

The main body function control unit 60 is equipped with a CPU 561, a RAM 62, a program memory 63, a data memory 64, and an input/output I/F unit 65. While a preselected storage area of the RAM 62 is used as a work area, the CPU 61 executes various sorts of control programs stored in the programmemory 63, and transmits control signals to the respective units in order to control overall operations of the electronic appliance 3.

The program memory 63 has stored thereinto a user identification program including a fingerprint identification program 63a and a voiceprint identification program 63b.

In this case, the main body function control unit 60 may alternatively perform a voiceprint identification process operation based upon voice (voiceprint) of a user entered from the microphone 41 in combination with a fingerprint identification process operation when the CPU 61 executes the user identification process operation by way of the fingerprint identification process operation based upon this fingerprint identification program 63a.

The data memory 64 contains a fingerprint data storage area 64a and a voiceprint data storage area 64b. In the fingerprint data storage area 64a, fingerprint data of previously-registered regular users have been stored. Similarly, in the voiceprint data storage area 64b, voiceprint data of previously-registered regular users have been stored.

User Identification Process Operation

Next, a user identification process operation executed by the main body function control unit 60 will now be explained.

When a user inserts the card type device 1 into the card slot 31 of the electronic appliance 3, the main body function control unit 60 thereof initiates the user identification program 63c, and thus executes the fingerprint identification process operation.

In the fingerprint identification process operation, such an indication is firstly displayed on the display unit 33 in which the CPU 61 prompts the user to move the roller 21 along one direction, while the finger 100 of this user is contacted to this roller 21 by applying predetermined pressure. In this case, such a message may be notified to the user by using the speaker 42.

When the user rotates the roller 21 by using the finger 100, as previously explained, the control unit 16 of the card type device 1 executes a fingerprint reading process operation, and then transmits the read fingerprint data from the card type device 1 via both the input/output I/F units 17 and 65 to the electronic appliance 3.

When the fingerprint data is received from the card type device 1, the main body function control unit 60 provided on the side of the electronic appliance 3 identifies the received fingerprint data of the user with the fingerprint data previously registered in the data memory 64 in order to judge as to whether or not the received fingerprint data is made coincident with the registered fingerprint data. It should also be noted that at this time, the main body function unit 60 may alternatively extract feature patterns from the respective fingerprint data, and thus may judge as to whether or not the received fingerpattern data is made coincident with the registered fingerpattern data based upon the extracted feature patterns. Also, since an occurrence of such a shift (deviation) in fingerprint data may be predicted, a verification ratio "A" between both received fingerprint data and registered fingerprint data is calculated. This shift in these fingerprint data is caused by a position and depression strength of the finger 100 which is contacted to the roller 21 by applying certain pressure. If the calculated verification ratio "A" is larger than, or equal to a predetermined reference value (for example, 85%), the main body function control unit 60 may alternatively judge that the received fingerprint data is made coincident with the registered fingerprint data.

As a result of this identification process operation, when the main body function control unit 60 judges that the received fingerprint data is made coincident with the registered fingerprint data, the main body function control unit 60 displays this judgement result on the display unit 33, and commences a voiceprint identification processing operation.

In this voiceprint identification processing operation, the main body function control unit 60 identifies as to whether or not a voiceprint of the user acquired from the microphone 41 is made coincident with the registered voiceprint data which has been registered in the voiceprint data storage area 64b of the data memory 64. When the main body function control unit 60 judges that the received voiceprint data is made coincident with the registered voiceprint data, this main body function control unit 60 identifies that this user is the normal user who has been previously registered.

It should also be understood that when the main body function control unit 60 identifies that the user is not the regular user by executing this user identification processing operation, the various functions of the electronic appliance 3 are brought into limited conditions.

It should also be understood that while both fingerprint data and voiceprint data as to a plurality of registered users may be stored in the data memory 64, since the card type device 1 is mounted on the electronic appliance 3, the main body function control unit 60 may identify a plurality of users. As a consequence, both a usable function and a not-usable function may be set with respect to each of the plural registered users may be alternatively set.

It is desirable to set such an operation condition as to an identification results of a user. That is, in such a case that no operation is not carried out from the operation input unit 32 for a predetermined time, this identification result may be deleted and the electronic appliance 3 may be set to the initial condition thereof.

Advantages of First Card Type Device 1

In accordance with the above-explained card type device 1, since the two-dimensional image of the finger is acquired by the one-dimensional image sensor, the area required to mount this one-dimensional image sensor can be decreased, and further, the fingerprint reading sensor 2 can be also mounted even on such a micro-compact type memory card as a CF card. Also, in comparison with such a case that a two-dimensional fingerprint reading sensor is provided, the cost of the components which constitute the fingerprint sensor such as the CCD can be reduced. With employment of these structures, the fingerprint identification function can be readily extended in the general user-oriented electronic appliance 3, for example, the portable telephone 3a, 3b, 3c (see FIG. 5 and FIG. 6), the PDA 3d (see FIG. 7), and the wrist watch 3e (see FIG. 8).

Furthermore, since the one-dimensional image sensor 25 is arranged inside the roller 21 which is made of the light transparent material, and also, since the finger 100 is moved over the outer peripheral plane 21a of the roller 21 under such a condition that this finger 100 is contacted to this outer peripheral plane 21a by applying certain pressure, the finger 100 can be moved while being guided along the direction perpendicular to the one-dimensional image sensor 25. As a result, both deformation and distortions of the finger 100 which occur during the fingerprint reading operation can be avoided. Also, since the move amounts of the finger 100 can be readily managed by operating the rotary encoder, the timing when the one-directional fingerprint data is acquired by the one-dimensional image sensor 25 can be controlled.

Also, since the roller 21 is provided under such a condition that this roller 21 is projected from the insertion port of the card slot 31, this roller 21 can be readily rotated and can own higher operability. In addition, since the fingerprint reading unit 2 can be made compact, even under such a condition that the card type device 1 is mounted on the electronic appliance 3, this fingerprint reading unit 2 is not largely projected out from the card slot 31, but this card type device 1 can own superior portability.

Also, since the operations of the electronic appliance 3 can be restricted based upon the identification result of the user, it is possible to prevent the illegal uses of the electronic appliance 3, the illegal accesses to the personal information stored in the electronic appliance 3, and also, the illegal accesses to the personal information stored in the card type device 1.

It should also be understood that in the above-described first embodiment, when the card type device 1 is mounted on the electronic appliance 3, the user identification process operation is executed based upon the fingerprint data by the electronic appliance 3. However, the present invention is not limited only to this first embodiment. Alternatively, while the card type device 1 is continuously mounted on the electronic appliance 3, for instance, when an electronic commercial transaction is carried out via a communication network such as the Internet by employing the mobile communication unit 50, a user identification process operation may be carried out only in such a case that user identification is required.

Also, in the first embodiment, the user identification process operation is carried out in the electronic appliance 3. Alternatively, such a user identification process operation may be carried out by other electronic appliances (for example, server) which are connected to the communication network.

Second Card Type Device 7

Next, a second embodiment of the present invention will now be explained. In this second embodiment, a user identification process operation is executed in a card type device 7 based upon a fingerprint. It should be understood that the same reference numerals shown in the above-explained first embodiment will be employed for denoting the same, or similar structural units indicated in the second embodiment.

Figure 9:
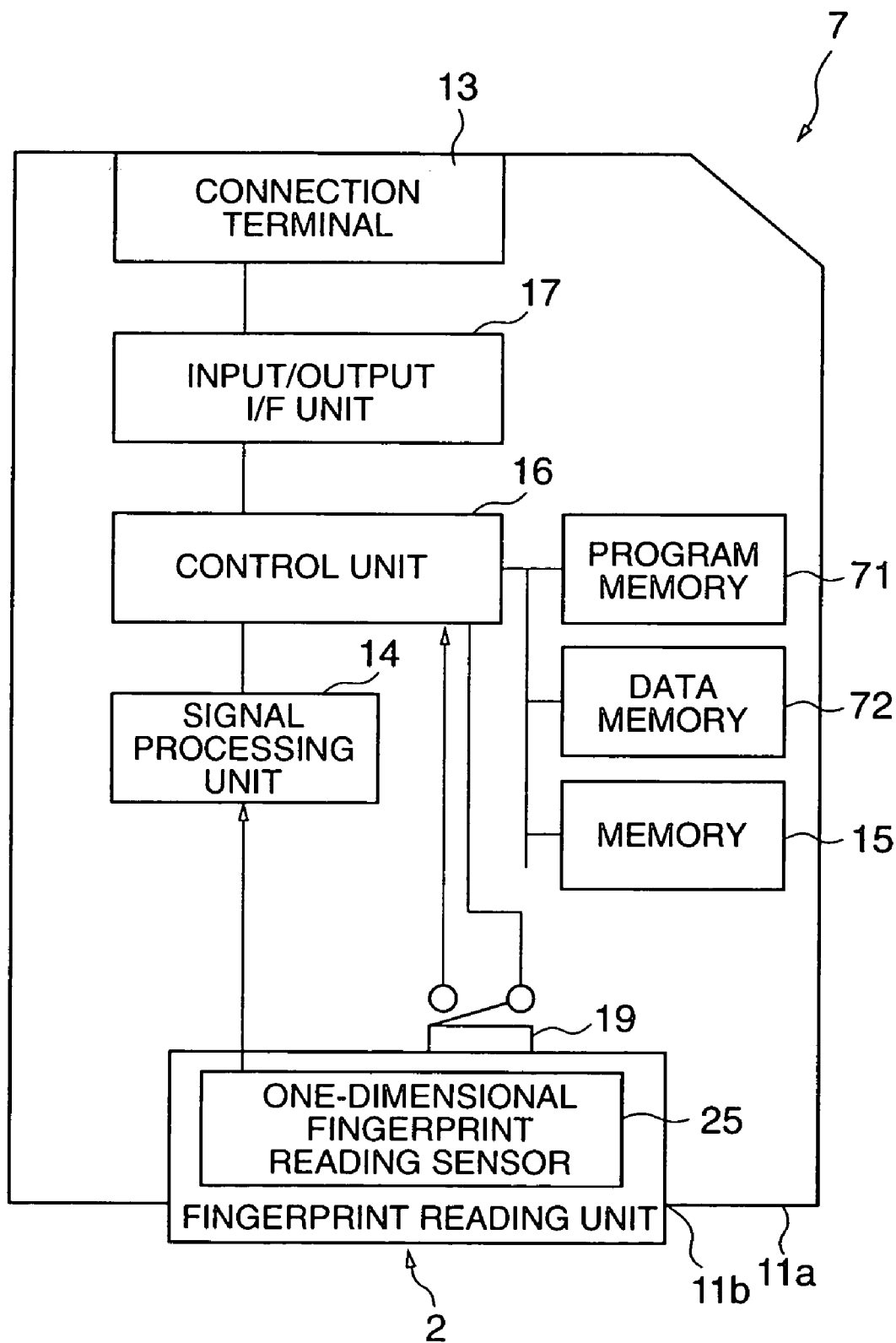
FIG. 9 is a diagram for schematically indicating a functional structure of a card type device according to a second embodiment, to which the present invention is applied.

FIG. 9 schematically shows an internal arrangement of the card type device 7 according to the second embodiment of the present invention. The card type device 7 contains a program memory 71 which has stored thereinto a fingerprint identification program, and a data memory 72 which has stored thereinto fingerprint data of regular users.

In the second embodiment, a user identification process operation is carried out based upon a fingerprint identification process operation on the side of a control unit 16 of the card type device 7. In this case, the control unit 16 executes the fingerprint identification process operation in accordance with the fingerprint identification program stored in the program memory 71. In this fingerprint identification process operation, the control unit 16 identifies such a fingerprint data which has been synthesized based upon one-dimensional fingerprint data acquired from the fingerprint reading unit 2 with respect to such a fingerprint data which has been stored in the data memory 72. An identification result is notified via the input/output I/F unit 17 to the electronic appliance 3. Upon receipt of This notified identification result, the electronic appliance 3 may allow and/or prohibit an execution of a specific function.

The above-described card type device 7, according to the second embodiment, can identify the user based upon the fingerprint before this card type device 7 is connected to the electronic appliance 3. Apparently, under such a condition that the card type device 7 is mounted on the electronic appliance 3, the control unit 16 of this card type device 7 may alternatively execute the fingerprint identification process operation.

Also, in the case that secret information has been stored in the memory 15 of the card type device 7, if fingerprint data acquired via the one-dimensional image sensor 25 is not made coincident with the fingerprint data which has been stored in the data memory 72, then the control unit 16 of this card type device 7 may restrict transmission/reception of data between the own card type device 7 and the electronic appliance 3 in order to prevent an illegal use of the secret information stored in the memory 15.

Third Card Type Device 8

Next, a third embodiment of the present invention will now be explained. It should be understood that the same reference numerals shown in the above-explained first embodiment will be employed for denoting the same, or similar structural units indicated in the third embodiment.

Figure 10:
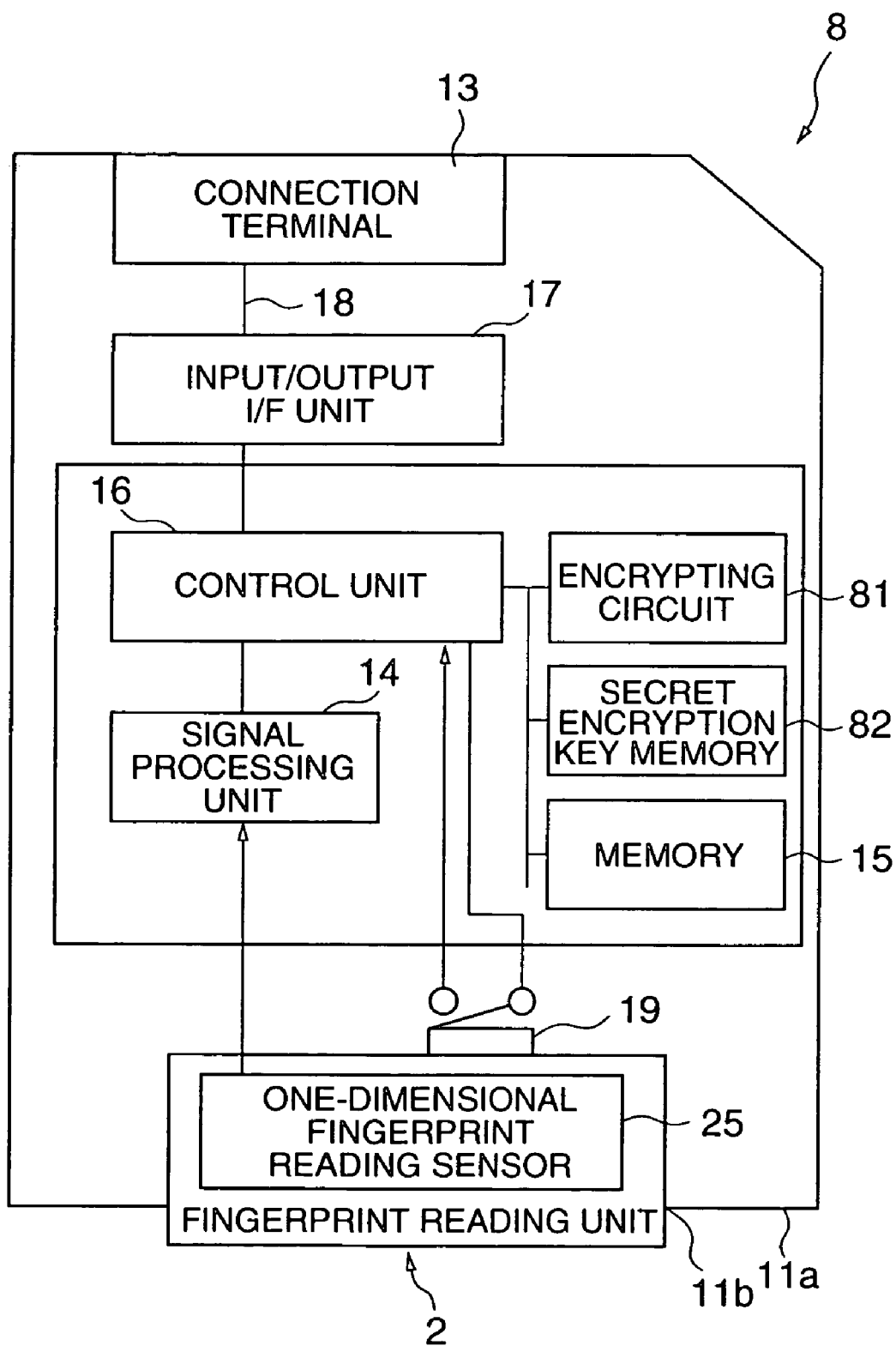
FIG. 10 is a diagram for schematically showing a functional structure of a card type device according to a third embodiment, to which the present invention is applied.

As shown in FIG. 10, a card type device 8, according to a third embodiment of he present invention, contains an encrypting circuit 81, and a secret key memory 82 which has stored thereinto secret encryption keys. The signal processing unit 14, the memory 15, the control unit 16, the encrypting circuit 81, and the secret key memory 82 of this card type device 8 have been integrated in an identification chip having an tamper resistant characteristic.

The expression "tamper resistant" implies a function capable of resisting physical shocks (illegal accesses, alternations etc.) to some extent. In other words, this card type device 8 is equipped with such a physical structure and a preventing means as follows: The physical structure cannot allow illegal accesses to this card type device 8, which are issued from an external source. Also, in such a case that the card type device 8 is tried to be disassembled so as to electronically analyze the secret keys and the like, the preventing means can prevent forged data, modified data, altered data, and the like in such a manner that the circuitry of the IC chip itself may be electrically destroyed.

The encrypting circuit 81 encrypts fingerprint data synthesized by the control unit 16 based upon a specific secret encryption key which is specifically designed to this card type device 8 and has been stored in the secret key memory 82, and then transmits this encrypted fingerprint data via the input/output I/F unit 17 to the electronic appliance 3. In this electronic appliance 3, the encrypted fingerprint data is decrypted by using a decryption key, and then, a fingerprint identification process operation is carried out. Thereafter, the main body function control unit 60 controls a function which can be executed by the user in response to an identification result. Alternatively, the electronic appliance 3 may not execute both the decryption process operation and the identification process operation by the own electronic appliance 3, but may transfer the encrypted fingerprint data which has been transmitted from the card type device 8 to a server provided in a network, so that this server may execute the decryption process operation and the identification process operation.

In this third embodiment, the above-explained "secret encryption key" corresponds to such a key information which is employed in order to perform encrypting/decrypting operations based upon a so-called "PKI (Public Key Infrastructure) encrypting system." It should be understood that information which has been encrypted by this secret encryption key can be decrypted by using only a PKI decrypt key corresponding thereto.

As a consequence, in accordance with the card type device 8 of this third embodiment, since the fingerprint data which has been encrypted based upon the secret encryption key by the encrypting circuit 81 is transmitted to the electronic appliance 3, or transmitted via this electronic appliance 3 to the server provided on the network, either the electronic appliance 3 or the server provided on the network cannot decrypt this encrypted fingerprint data except that either this electronic appliance 3 or the network server owns the PKI decrypt key which constitutes the paired key with respect to the above-described secret encryption key. As a result the card type device 8 can avoid the unfair use of the fingerprint data, and can further improve the security aspect.

Fourth Card Type Device 9

Next, a fourth embodiment of the present invention will now be explained. It should be understood that the same reference numerals shown in the above-explained first embodiment will be employed for denoting the same, or similar structural units indicated in the fourth embodiment.

Figure 11A:
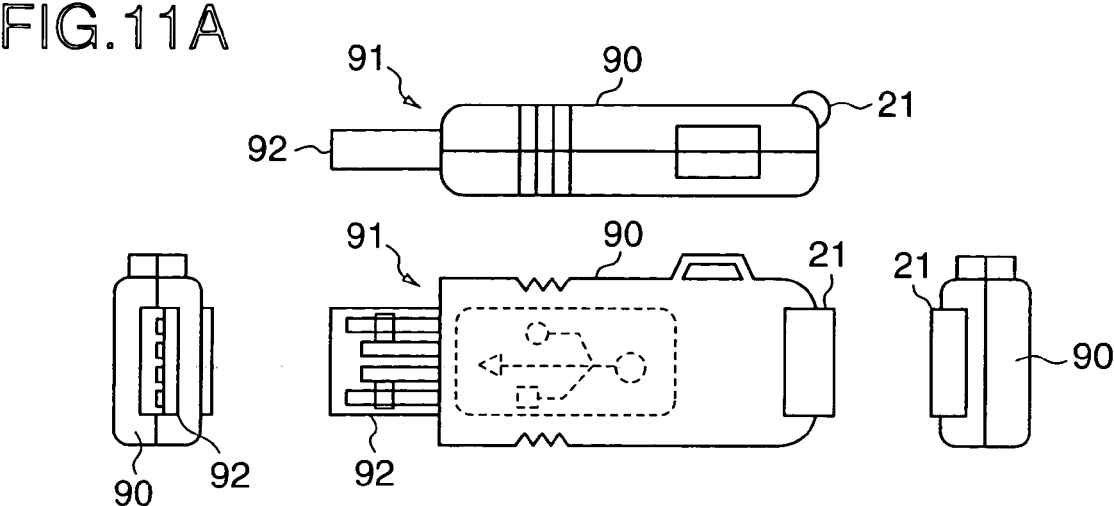
FIG. 11A to FIG. 11C illustratively show outer appearance construction examples of a card type device according to a fourth embodiment, to which the present invention is applied.
Figure 11B:
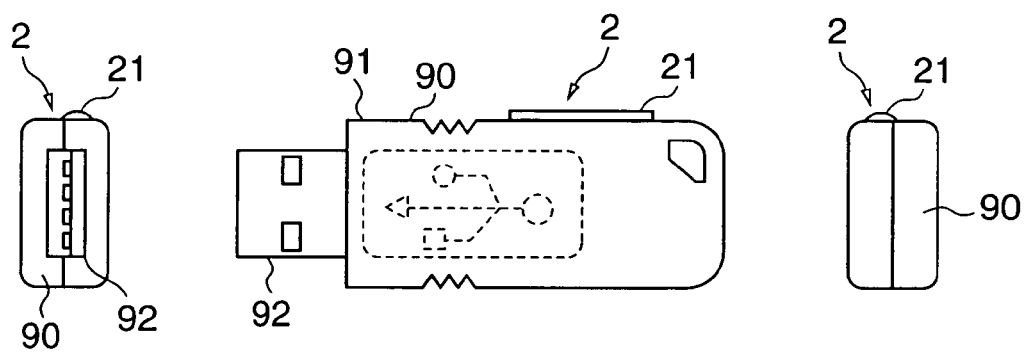
Figure 11C:
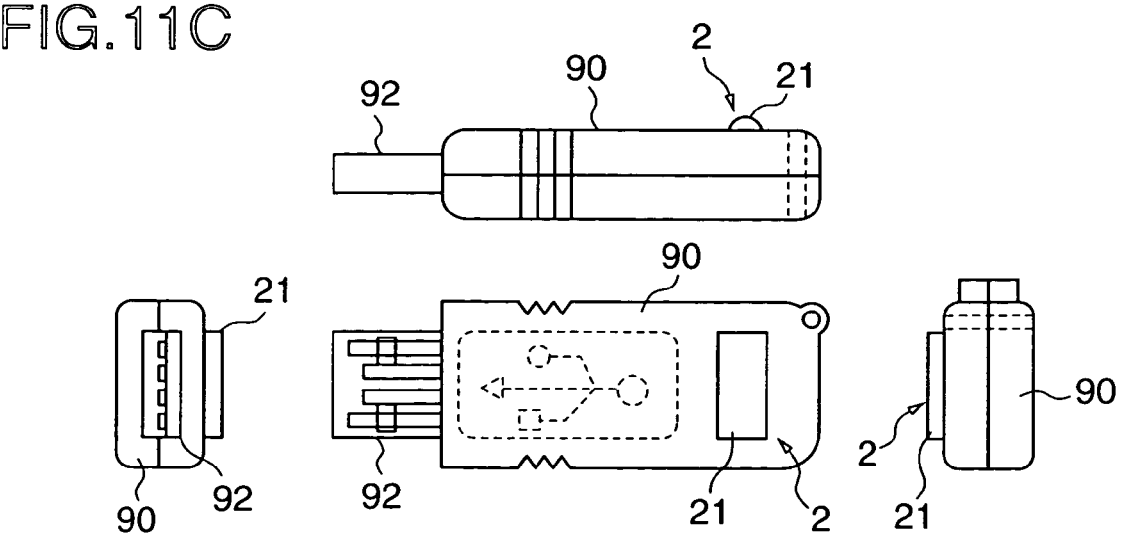

FIG. 11A to FIG. 11C illustratively show outer appearance examples of USB-connection portable type flash memories which correspond to a card type device 9 according to the fourth embodiment of the present invention. In each of the USB-connection portable type flash memories indicated in FIG. 11A, FIG. 11B, and FIG. 1C, a USB (Universal Serial Bus) terminal 92 is equipped with a one edge portion 91 of a housing 90, a fingerprint reading unit 2 is provided with an edge surface of the housing 90, and a roller 21 is projected from the edge surface. Also, a flash memory (Flash EPROM: Erasable Programmable Read-Only Memory) is stored inside the housing 90, and may be used as an external memory device.

Since these card type devices 9 are detachably mounted on an electronic appliance (for example, PDA and personal computer) equipped with a serial interface circuit designed based upon the USB standard, data may be transmitted/received between these card type devices 9 and the electronic appliance.

Figure 12:
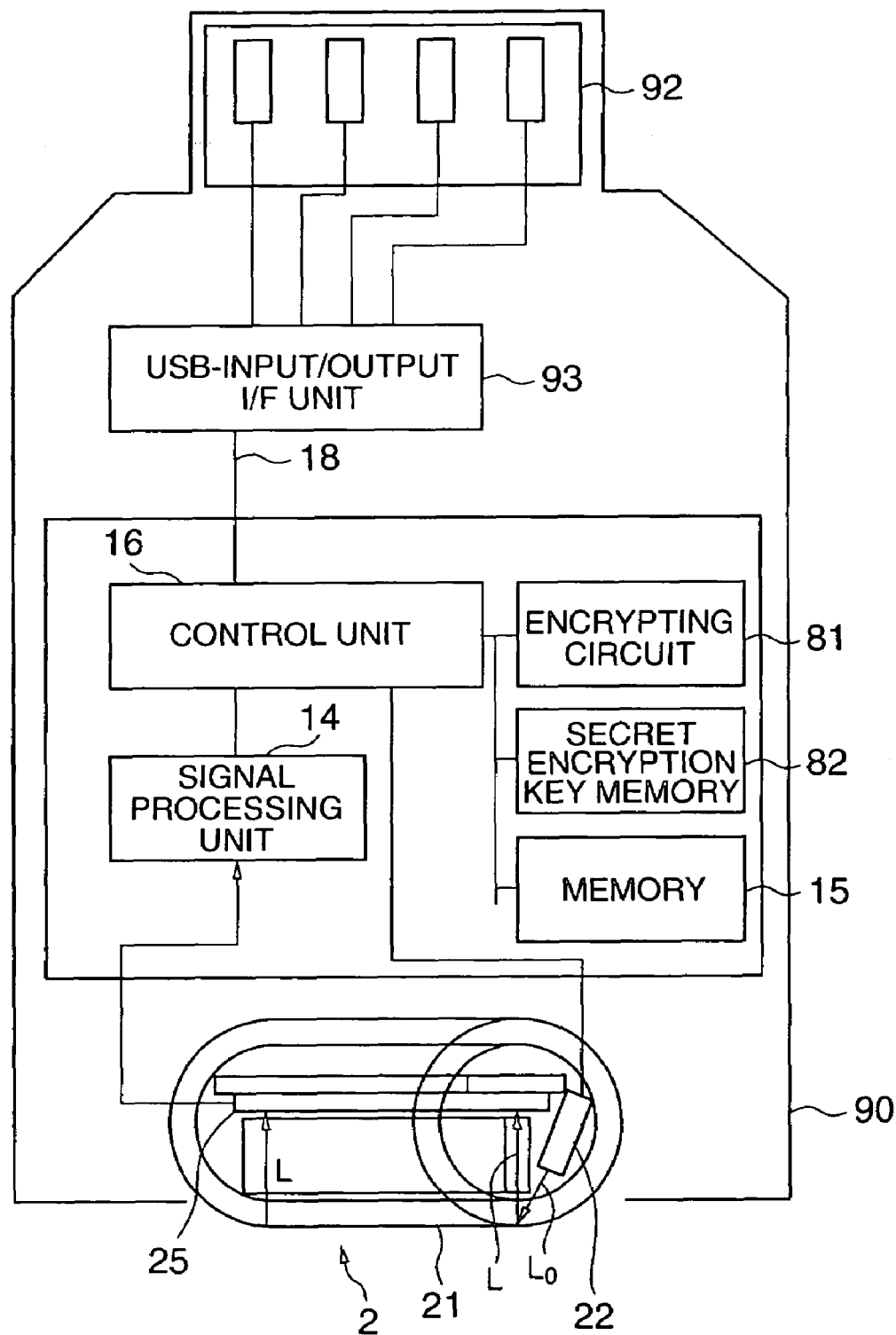
FIG. 12 is a diagram for schematically indicating a functional structure of the card type device shown in FIG. 11A.

Next, a description is made of a functional structure of the card type device 9 shown in FIG. 12. As shown in FIG. 12, this card type device 9 contains a USB input/output I/F circuit 93, an encrypting unit 81, a secret key memory 82 which has stored thereinto secret encryption keys, a signal processing unit 14, a memory 15, a control unit 16, and a fingerprint reading unit 2. Similar to the above-explained third embodiment, the signal processing unit 14, the memory 15, the control unit 16, the encrypting unit 18, and also, the secret key memory 82 have been integrated in an LSI (Large-Scaled Integration) chip having the above-defined tamper resistant characteristic.

While electronic certifications made based upon the PKI encryption system passwords, and the like have been stored in the flash memory in this card type device 9, the card type device 9 expresses the electronic certifications and the passwords by using specific data called as "Token", and then sends out these processed electronic certifications and passwords to either an electronic appliance connected via the USB terminal 92 or a network via the electronic appliance. At this time, the card type device 9 is controlled in such a manner that the electronic certifications cannot be sent to the electronic appliance 3 unless a user identification process operation based upon a fingerprint read by the fingerprint reading unit 2 is accomplished.

As a modification of this fourth embodiment, the identification process operation of the fingerprint data may be carried out on the side of the electronic appliance 3 to which the card type device 9 is connected in a similar manner to that of the first embodiment, on the side of the card type device 9 in a similar way to that of the second embodiment, or an identification-purpose server which is connected via a network to the card type device 9.

In such a case that the identification process operation of the fingerprint data is carried out by the identification-purpose server connected to the network, when fingerprint data is transmitted via the communication unit provided in the electronic appliance to the identification-purpose server, the fingerprint data may be encrypted by the encrypting circuit based upon the secret encrypt key so as to transmit the encrypted fingerprint data.

As a consequence, in such a case that user identification is required in, for example, an electronic commercial transaction, an electronic certification functioning as personal information cannot be used unless the user identification is accomplished based upon the fingerprint read by the fingerprint reading unit 2. Accordingly, it is possible to avoid the unfair uses of such personal information as the electronic certifications and the passwords, which have been stored in the card type device 9, and also possible to prevent "spoofing" actions made by the third party.

What is claimed is:

1. A card type device comprising:
   a card type housing;
   a transparent cylindrical-shaped roller provided at an edge plane of said card type housing, the outer peripheral plane of which is projected from said edge plane;
   a light source provided in an internal hollow portion of said roller, for irradiating a finger which abuts against the outer peripheral plane of said roller;

a one-dimensional image sensor provided in said internal hollow portion of said roller, for acquiring one-dimensional fingerprint image data of the finger which abuts against the outer peripheral plane of said roller;

a SELFOC lens array provided in said internal hollow portion of said roller, for focusing a one-dimensional image of the finger which abuts against the outer peripheral plane of said roller onto said one-dimensional image sensor; and a holder for holding thereon said light source, said one-dimensional image sensor, and said SELFOC lens array, which is fixed to said card type housing in such a manner that even when said roller is rotated, said holder is not rotated.

2. A card type device as claimed in claim 1, further comprising:

fingerprint data synthesizing means for synthesizing two-dimensional fingerprint data from the one-dimensional fingerprint image data which are continuously acquired from said one-dimensional image sensor by rotating said roller by moving the finger abutting against the outer peripheral plane of the roller.

3. A card type device as claimed in claim 2 wherein:

said housing is further comprised of an insertion portion which is inserted into a card slot provided on said electronic appliance, and on which said connection terminal is arranged; and said roller is provided on an edge portion of the housing which is exposed from an insertion port of said card slot.

4. A card type device as claimed in claim 3, further comprising:

control means for identifying as to whether or not said fingerprint data synthesized by said fingerprint data synthesizing means is made coincident with fingerprint data which has been previously registered, and for outputting an identification result to said electronic appliance.

5. A card type device as claimed in claim 2, further comprising:

encrypting means for encrypting said fingerprint data based upon a secret encryption key which is specific to said card type device.

6. A card type device as claimed in claim 5 wherein:

said encrypting means is assembled in an LSI (large-scaled integration) chip having an tamper resisrant characteristic.

7. A card type device as claim in claim 1 wherein:

said SELFOC lens array is constituted in such a manner that a plurality of SELFOC lenses having center axes which are intersected perpendicular to a roller center of said roller are arrayed.

8. A card type device as claimed in claim 1 wherein:

said card type housing is provided with a connection terminal used to connect said card type device to an electronic appliance.

9. A card type device as claimed in claim 8 wherein:

said connection terminal owns a structure made based upon the USB (universal serial bus) standard.

* * * * *